(12) United States Patent
Gong et al.

(10) Patent No.: US 11,403,497 B2
(45) Date of Patent: Aug. 2, 2022

(54) CATEGORIZING FRACTURES IN A SUBSURFACE FORMATION

(71) Applicant: Chevron U.S.A. Inc., San Ramon, CA (US)

(72) Inventors: Bo Gong, Houston, TX (US); Hanming Wang, Fulshear, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/776,183

(22) Filed: Jan. 29, 2020

(65) Prior Publication Data
US 2021/0232868 A1  Jul. 29, 2021

(51) Int. Cl.
*G06K 9/62* (2022.01)
*G01V 99/00* (2009.01)
*G06V 10/75* (2022.01)

(52) U.S. Cl.
CPC ......... *G06K 9/6268* (2013.01); *G01V 99/005* (2013.01); *G06K 9/6262* (2013.01); *G06V 10/751* (2022.01)

(58) Field of Classification Search
CPC .. G06K 9/6268; G06K 9/6269; G06K 9/6262; G06K 9/6202; G01V 99/005
USPC ......................................................... 382/224
See application file for complete search history.

(56) References Cited

U.S. PATENT DOCUMENTS 8,060,309 B2  11/2011  Xue et al.
8,494,827 B2  7/2013  Mutlu et al.
8,521,494 B2  8/2013  Narr et al.
2005/0256645 A1  11/2005  Rabinovich et al.
2009/0248309 A1*  10/2009  Neville .................. G01V 5/107
                                                          250/269.4

(Continued)

FOREIGN PATENT DOCUMENTS

WO  2013191748  12/2013
WO  2017127058 A1  7/2017

OTHER PUBLICATIONS

Faivre, Ollivier, et al.; "Fracture Evaluation from Quantitative Azimuthal Resistivities"; Oct. 1993, SPE 26434, pp. 179-185, 7 drawing sheets.

(Continued)

*Primary Examiner* — Ayodeji O Ayotunde

(57) ABSTRACT

Embodiments of categorizing fractures in a subsurface formation are provided herein. One embodiment comprises obtaining at least one borehole image for a plurality of fractures in a subsurface formation and at least one resistivity log for the plurality of fractures of the surface formation. The embodiment comprises determining first aperture data based on the at least one borehole image for the plurality of fractures and determining second aperture data based on the at the least one resistivity log for the plurality of fractures. The embodiment comprises comparing the first aperture data based on the at least one borehole image and the second aperture data based on at least one resistivity log to determine whether to categorize each fracture of the plurality of fractures as a naturally occurring fracture or a non-naturally occurring fracture. The embodiment comprises generating an output indicating the categorization of each fracture and displaying the output.

20 Claims, 9 Drawing Sheets

(56) References Cited

U.S. PATENT DOCUMENTS

| | | | |
|---|---|---|---|
| 2011/0064277 A1* | 3/2011 | Duncan | G01V 3/20 |
| | | | 382/109 |
| 2019/0292884 A1* | 9/2019 | McClure | G01V 1/306 |
| 2020/0191470 A1 | 6/2020 | Park et al. | |

OTHER PUBLICATIONS

Gong, Bo, et al.; "Improving the Estimation of Fracture Length Using Resistivity and Borehole Image Logs"; Oct. 2020, SPE-201532-MS, pp. 1-9.

Lefranc, Marie, et al.; "Fractured Basement Reservoir Characterization for Fracture Distribution, Porosity and Permeability Prediction"; Dec. 2012, Search and Discovery Article #41106, 23 pages.

Li, Shanjun, et al.; "Identification and Evaluation of Fractured Tight-Sand Oil Reservoir in Deep Zone of Bohai Gulf"; Jun. 2006, SPWLA 47th Annual Logging Symposium, 12 pages.

Luthi, S.M., et al.; "Fracture Apertures from Electrical Borehole Scans"; Jul. 1990, Geophysics, vol. 55, No. 7, pp. 321-833, 15 figures.

Maeso, Carlos, et al.; "Fracture Aperture Calculations from Wireline and Logging While Drilling Imaging Tools" Oct. 2014, SPE-170848-MS, pp. 1-13.

Pezard, Philippe A., et al.; "In Situ Measurements of Electrical Resistivity, Formation Anisotropy, and Tectonic Context"; Jun. 1990, SPWLA 31st Annual Logging Symposium, pp. 1-24.

Ponziani, Michel, et al.; "Experimental Validation of Fracture Aperture Determination from Borehole Electric Microresistivity Measurements"; 2015, Geophysics, vol. 80, No. 3, pp. D175-D181, 6 Figures, 2 tables.

Sibbit, A.M., et al.; "The Dual Laterlog Response in Fractured Rocks"; Jun. 1985, SPWLA Twenty-Sixth Annual Logging Symposium, pp. 1-34, 26 figures.

Wu, Peter, et al.; "Fracture Characterization Using Triaxial Induction Tools"; Jun. 2013, SPWLA 54th Annual Logging Symposium, pp. 1-16.

International Search Report, dated Apr. 20, 2021, during the prosecution of International Application No. PCT/IB2021/050371, 4 pages.

Written Opinion of the International Searching Authority, dated Apr. 20, 2021, during the prosecution of International Application No. PCT/IB2021/050371, 6 pages.

Wang, Hanming, et al.; "Efficient and Accurate Electromagnetic Modeling of Triaxial Induction Responses from Multiscale Fractures for Well-Logging Applications"; 2019, IEEE Journal on Multiscale and Multiphysics Computational Techniques, vol. 4, pp. 20-28.

* cited by examiner

CATEGORIZING FRACTURES IN A SUBSURFACE FORMATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to categorizing a fracture in a subsurface formation as a naturally occurring fracture or a non-naturally occurring fracture.

BACKGROUND

Understanding the geometry and distribution of subsurface fracture networks is important for reservoir quality characterization, field production forecast, well placement optimization, and hydrocarbon recovery design. Estimating fracture properties with well data has long been a challenge because wells only intercept a very small volume of rock, and hence have a high chance of under-sampling fracture networks. Among all the fracture properties, fracture length is one of the most difficult aspects to characterize, as fracture planes are often truncated by wells. In practice, most fracture lengths are observed from outcrops, which may differ from the actual subsurface environment. Due to its close links to vertical and lateral connectivity within the reservoirs, fracture length could be a strong factor in assessing the potential for hydrocarbon transport. On the other hand, shorter fractures may not have the potential for higher hydrocarbon recovery.

The ability to distinguish fractures in the subsurface formation is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for an improved manner of distinguishing fractures in a subsurface formation.

SUMMARY

Embodiments of categorizing fractures in a subsurface formation are provided herein.

In one embodiment, a computer-implemented method of categorizing fractures in a subsurface formation is provided herein. The embodiment comprises obtaining, with one or more processors, at least one borehole image for a plurality of fractures in a subsurface formation and at least one resistivity log for the plurality of fractures of the surface formation. The embodiment comprises determining, with the one or more processors, first aperture data based on the at least one borehole image for the plurality of fractures of the surface formation. The embodiment comprises determining, with the one or more processors, second aperture data based on at the least one resistivity log for the plurality of fractures of the surface formation. The embodiment comprises comparing, with the one or more processors, the first aperture data based on the at least one borehole image and the second aperture data based on at least one resistivity log to determine whether to categorize each fracture of the plurality of fractures as a naturally occurring fracture or a non-naturally occurring fracture. The embodiment comprises generating, with the one or more processors, an output indicating the categorization of each fracture of the plurality of fractures. The embodiment comprises displaying, with the one or more processors, the output on a graphical user interface.

In one embodiment, a computer system comprises one or more processors, memory, and one or more programs is provided herein. The one or more programs are stored in the memory and configured to be executed by the one or more processors, the one or more programs including instructions that when executed by the one or more processors cause the computer system to obtain at least one borehole image for a plurality of fractures in a subsurface formation and at least one resistivity log for the plurality of fractures of the surface formation. In the embodiment, the one or more programs including instructions that when executed by the one or more processors cause the computer system to determine first aperture data based on the at least one borehole image for the plurality of fractures of the surface formation and determine second aperture data based on at the least one resistivity log for the plurality of fractures of the surface formation. In the embodiment, the one or more programs including instructions that when executed by the one or more processors cause the computer system to compare the first aperture data based on the at least one borehole image and the second aperture data based on at least one resistivity log to determine whether to categorize each fracture of the plurality of fractures as a naturally occurring fracture or a non-naturally occurring fracture. In the embodiment, the one or more programs including instructions that when executed by the one or more processors cause the computer system to generate an output indicating the categorization of each fracture of the plurality of fractures and display the output on a graphical user interface.

In one embodiment, a non-transitory computer readable storage medium storing one or more programs is provided. The one or more programs comprising instructions, which when executed by an electronic device with one or more processors and memory, cause the device to obtain at least one borehole image for a plurality of fractures in a subsurface formation and at least one resistivity log for the plurality of fractures of the surface formation. The one or more programs comprising instructions, which when executed by an electronic device with one or more processors and memory, cause the device to determine first aperture data based on the at least one borehole image for the plurality of fractures of the surface formation. The one or more programs comprising instructions, which when executed by an electronic device with one or more processors and memory, cause the device to determine second aperture data based on at the least one resistivity log for the plurality of fractures of the surface formation. The one or more programs comprising instructions, which when executed by an electronic device with one or more processors and memory, cause the device to compare the first aperture data based on the at least one borehole image and the second aperture data based on at least one resistivity log to determine whether to categorize each fracture of the plurality of fractures as a naturally occurring fracture or a non-naturally occurring fracture. The one or more programs comprising instructions, which when executed by an electronic device with one or more processors and memory, cause the device to generate an output indicating the categorization of each fracture of the plurality of fractures, and display the output on a graphical user interface.

BRIEF DESCRIPTION OF THE DRAWINGS

Like reference numerals refer to corresponding parts throughout the drawings.

DETAILED DESCRIPTION OF EMBODIMENTS

Figure 1A:
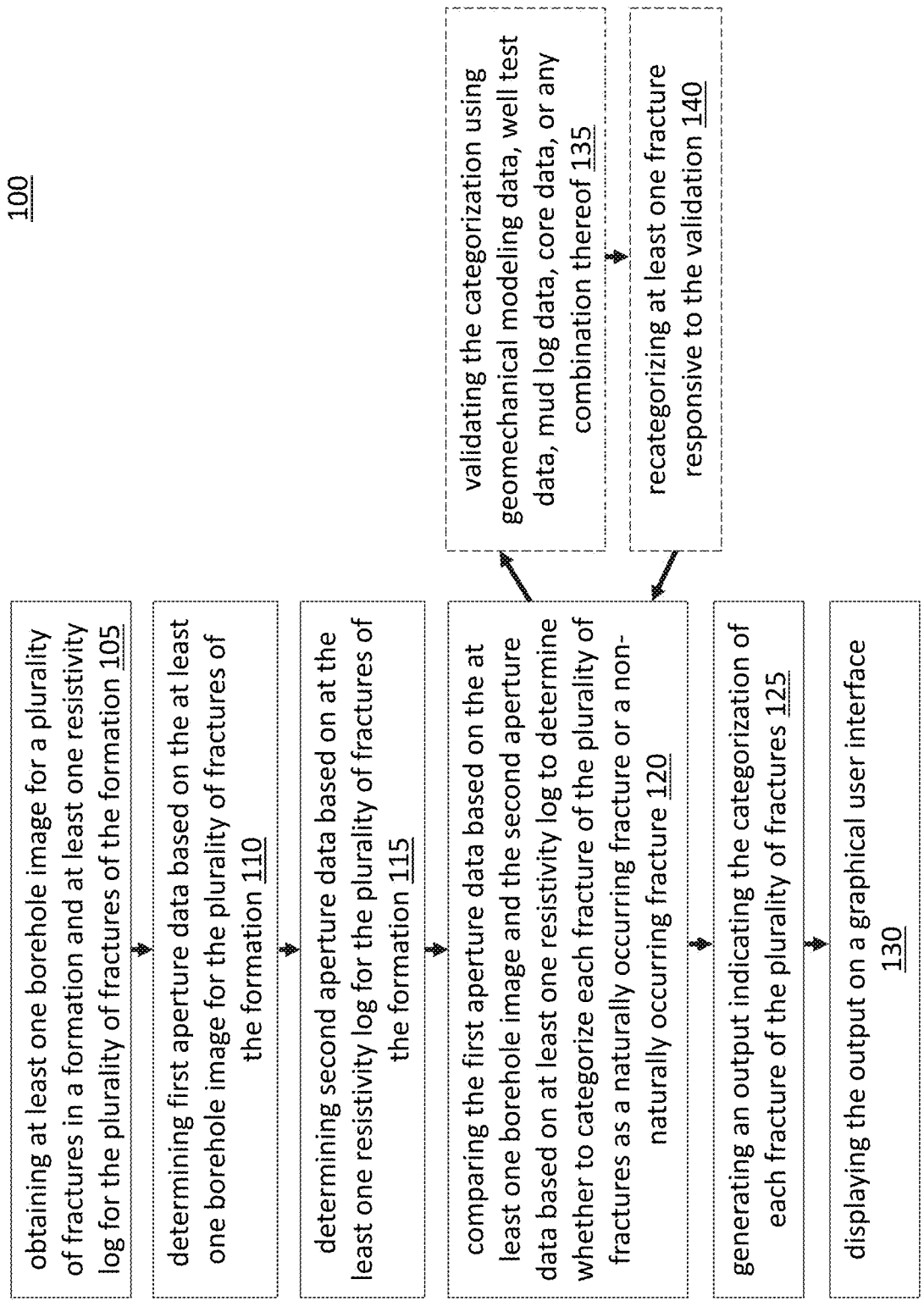
FIGS. 1A-1B illustrate a flowchart of a method of categorizing fractures in a subsurface formations, in accordance with some embodiments.

Described below are methods, systems, and computer readable storage media that provide a manner of categorizing fractures in a subsurface formation, such as categorizing a fracture as a naturally occurring fracture or a non-naturally occurring fracture. These embodiments are designed to be of particular use for reservoir modeling, estimating hydrocarbon in place, or any combination thereof.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Embodiments of categorizing fractures in a subsurface formation are provided herein. In one embodiment, a computer-implemented method of categorizing fractures in a subsurface formation is provided herein. The embodiment comprises obtaining, with one or more processors, at least one borehole image for a plurality of fractures in a subsurface formation and at least one resistivity log for the plurality of fractures of the surface formation. The embodiment comprises determining, with the one or more processors, first aperture data based on the at least one borehole image for the plurality of fractures of the surface formation. The embodiment comprises determining, with the one or more processors, second aperture data based on at least one resistivity log for the plurality of fractures of the surface formation. The embodiment comprises comparing, with the one or more processors, the first aperture data based on the at least one borehole image and the second aperture data based on at least one resistivity log to determine whether to categorize each fracture of the plurality of fractures as a naturally occurring fracture or a non-naturally occurring fracture. The embodiment comprises generating, with the one or more processors, an output indicating the categorization of each fracture of the plurality of fractures. The embodiment comprises displaying, with the one or more processors, the output on a graphical user interface.

For example, fracture length may be categorized using laterolog-type resistivity and electrical borehole image logs, based on the different sensitivities of the two types of downhole measurements. In a well drilled with water-based mud, open fractures can get invaded and become electrically conductive, altering the responses of resistivity and imaging tools. While borehole imaging tools are capable of detecting many open fractures regardless of their length, resistivity tools are generally more sensitive to long fractures. Through numerical modeling and inversion, resistivity and borehole image can be processed to locate open fractures. By comparing the identified fractures from resistivity and borehole image in one well, each fracture can be categorized as a naturally occurring fracture or a non-naturally occurring fracture based on the comparison.

A naturally occurring fracture is typically long in length (e.g., a plurality of feet long such as tens of feet long, of from 20 feet-30 feet long, of from 20 feet-40 feet long, of from 20 feet-50 feet long, of from 20 feet-75 feet long, of from 20 feet-100 feet long, of from 100 feet-200 feet long, or longer than these ranges), and thus, may be referred to as a "long fracture". A naturally occurring fracture is simply present in the subsurface formation.

A non-naturally occurring fracture is typically short in length (e.g., of from less than 10 inches such as: of from ½ inch-10 inches, of from 5 inches-10 inches, or 2 inches-8 inches), and thus, may be referred to as a "short fracture". A non-naturally occurring fracture may have been created in the formation during drilling of a wellbore (also referred to as well) in the subsurface formation. For example, a wellbore may be drilled into the formation using practically any drilling technique and equipment in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore. The equipment to be used in drilling the wellbore may be dependent on the design of the wellbore, the formation, the hydrocarbons, etc. Usage of a dense drilling mud while drilling the wellbore, for example, may lead to creation of non-naturally occurring fractures ("short fractures") that are a few inches in length.

Advantageously, embodiments consistent with this disclosure may be utilized for reservoir modeling, estimating hydrocarbon in place, or any combination thereof. For example, fractures categorized as naturally occurring fractures may be utilized in reservoir models and fractures categorized as non-naturally occurring fractures may be excluded in the reservoir models. By doing so, reservoir modeling and/or simulation may be more accurate, may be computationally faster, may use fewer computer resources, etc. The new results may improve the understanding of the regional fracture system and lead to more accurate fracture network models. The reservoir modeling and/or simulation may be utilized to make decisions regarding well spacing, well location, well type (e.g., vertical trajectory, horizontal trajectory, high angle trajectory, etc.), well pad, etc.

Advantageously, embodiments consistent with this disclosure may be utilized in the context of drilling. For example, the embodiments may be utilized to adjust the mud weight of the drilling mud, adjust the components of the drilling mud, address drilling mud type, etc. to reduce or prevent non-naturally occurring fractures. Indeed, if drilling mudA is leading to non-naturally occurring fractures based on the categorization, then the drilling mudA may be adjusted or replaced with drilling mudB (e.g., that is less dense than drilling mudA) to reduce or prevent non-naturally occurring fractures. As another example, if a particular portion of the subsurface formation includes a predetermined quantity of non-naturally occurring fractures based on the categorization, the trajectory of the wellbore may be adjusted to steer away from the non-naturally occurring fractures to improve or maintain wellbore stability. As another example, if a particular portion of the subsurface includes a predetermined quantity of naturally occurring fractures based on the categorization, at least one new well may be drilled in a location and with a trajectory to take advantage of that particular portion having naturally occurring fractures. Of note, practically any type of drilling fluid, including conductive and non-conductive mud, are contemplated herein, as vendors design different tools for different mud systems. Similarly, practically any logging operation methods, including wireline logging and logging while drilling (LWD), are contemplated herein, as vendors design different tools for different operations.

Advantageously, embodiments consistent with this disclosure may be utilized to generate production forecasts for practically any type of hydrocarbon such as, but not limited to, oil production and gas production. Embodiments consistent with this disclosure may be utilized to generate production forecasts for practically any type of production such as, but not limited to, cumulative production and estimated ultimate recovery (EUR). The embodiments consistent with this disclosure may be utilized to forecast hydrocarbon production of a wellbore drilled in a conventional formation. The embodiments consistent with this disclosure may be utilized to forecast hydrocarbon production of a wellbore drilled in an unconventional formation. The more accurate production forecasts may enable better development planning, economic outlook, reserve estimates, and business decisions, reservoir management decisions (e.g., selection and execution of hydrocarbon recovery processes), especially for unconventional and tight rock reservoirs.

Advantageously, embodiments consistent with this disclosure may lead to more accurate characterization of reserves, which may be utilized in the trading strategy.

Advantageously, embodiments consistent with this disclosure may be utilized to optimize productivity of a producing hydrocarbon bearing formation and drive reservoir management decisions. (1) As an example, embodiments consistent with this disclosure may be utilized to optimize well designs, including orientation of wellbores, drilling mud weight, casing points, completion designs, etc. (2) As an example, embodiments consistent with this disclosure may be utilized to identify azimuth, wellbore length, landing zone (depth), geosteering to follow the landing zone, etc. For example, higher producers and their associated depths may be identified and utilized to drill a new wellbore to that identified associated depth. (3) As another example, the embodiments consistent with this disclosure may be utilized to control flow of fluids injected into or received from the formation, a wellbore, or any combination thereof. Chokes or well control devices that are positioned on the surface, downhole, or any combination thereof may be used to control the flow of fluid into and out. For example, surface facility properties, such as choke size, etc., may be identified for the high producers and that identified choke size may be utilized to control fluid into or out of a different wellbore. (4) As an example, embodiments consistent with this disclosure may be utilized in hydrocarbon exploration and hydrocarbon production to select completions, components, fluids, etc. For example, a variety of casing, tubing, packers, heaters, sand screens, gravel packs, items for fines migration, etc. may be selected for each wellbore to be drilled based on the corresponding items that are identified for the higher producers.

Figure 1B:
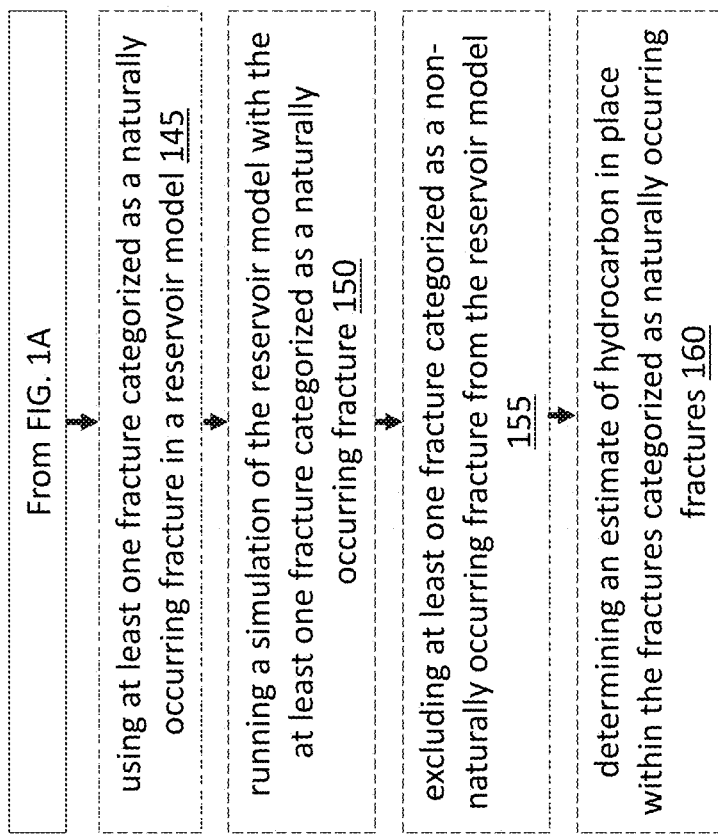

FIG. 1 illustrates a flowchart of an embodiment of a method 100 of categorizing fractures in a formation. At 105, the method 100 includes obtaining at least one borehole image for a plurality of fractures in a formation and at least one resistivity log for the plurality of fractures of the surface formation. Obtaining may include receiving, requesting, accessing, etc. The data may be obtained in practically any manner in the art.

At 110, the method 100 includes determining first aperture data based on the at least one borehole image for the plurality of fractures of the surface formation. The plurality of fractures in the subsurface formation may include tens of fractures. The plurality of fractures of the surface formation may include hundreds of fractures. Practically any type of borehole imaging tool that has fracture detection capabilities, such as electrical and acoustic imagers, may have been utilized to generate the at least one borehole image. One example of a borehole imaging tool is an electrode-based resistivity imager.

In one embodiment, a first aperture based on the at least one borehole image for a particular fracture may be determined using equation (1) below:

$$W = c * AAC * R_m^b * R_f^{1-b} \tag{1}$$

where W is aperture, AAC is added area of current, $R_m$ is mud resistivity, $R_f$ is formation resistivity (matrix resistivity) near a wellbore, b and c are coefficients determined from modeling and are tool dependent. Equation (1) is valid as long as the particular fracture extends beyond the volume where the borehole imaging tool has sensitivity to fracture presence. This condition is usually satisfied because the depth of investigation for most borehole imaging tools is only several inches. Furthermore, determining the first aperture of the particular fracture via equation (1) includes using the location of the particular fracture, but dip is not necessary to determine the aperture of the particular fracture based on the at least one borehole image. The location may be determined in an automated manner from the at least one borehole image or received as input from a user. Equation (1) may be solved for each fracture of the plurality of fractures in some embodiments. Equation (1) is consistent with the equation described in Luthi and Souhaite, Fracture apertures from electrical borehole scans, Society of Exploration Geophysicists, Vol. 55, Issue 7, July 1990, pages 821-833, which is incorporated by reference.

Figure 2:
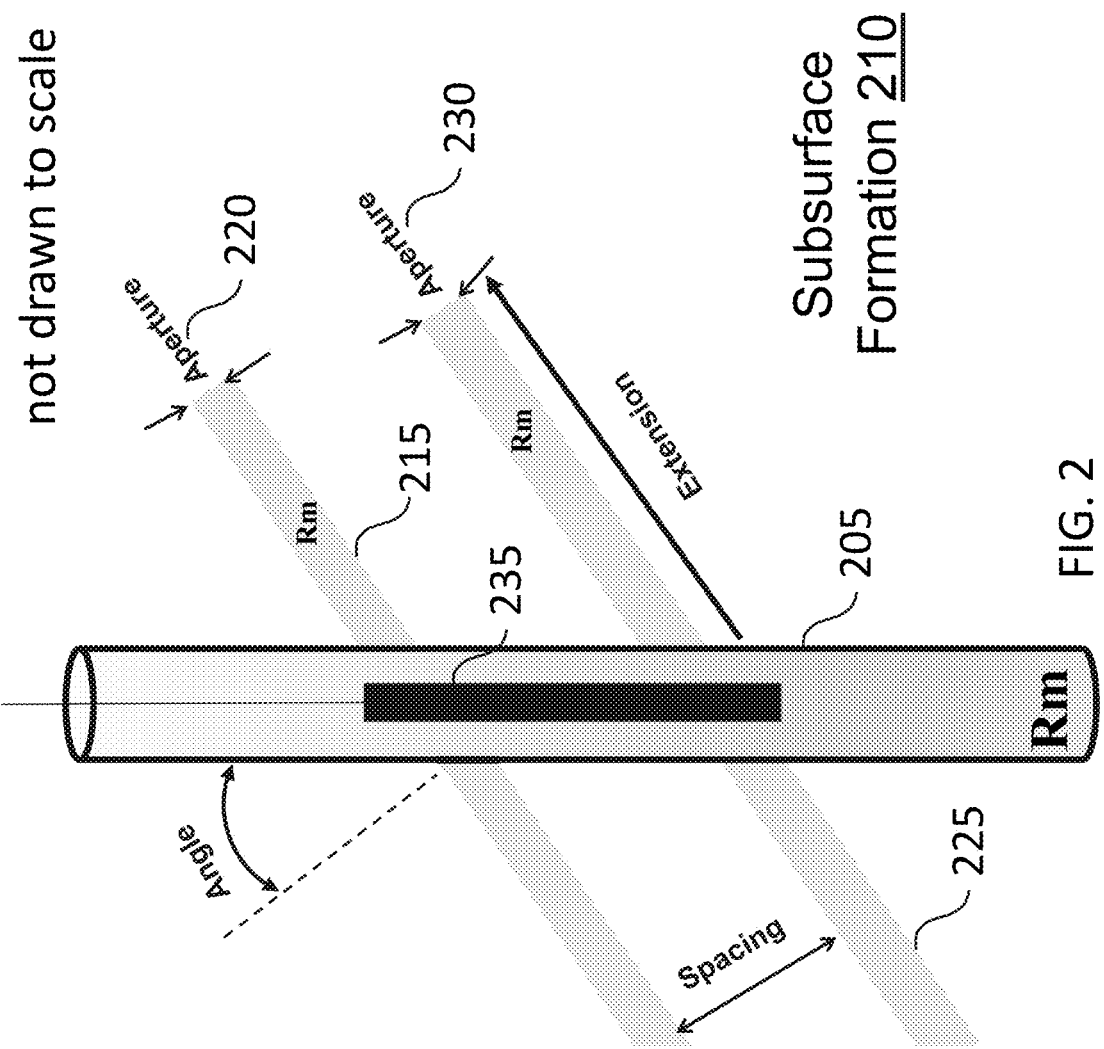
FIG. 2 illustrates an example of a formation with two fractures.
Figure 3:
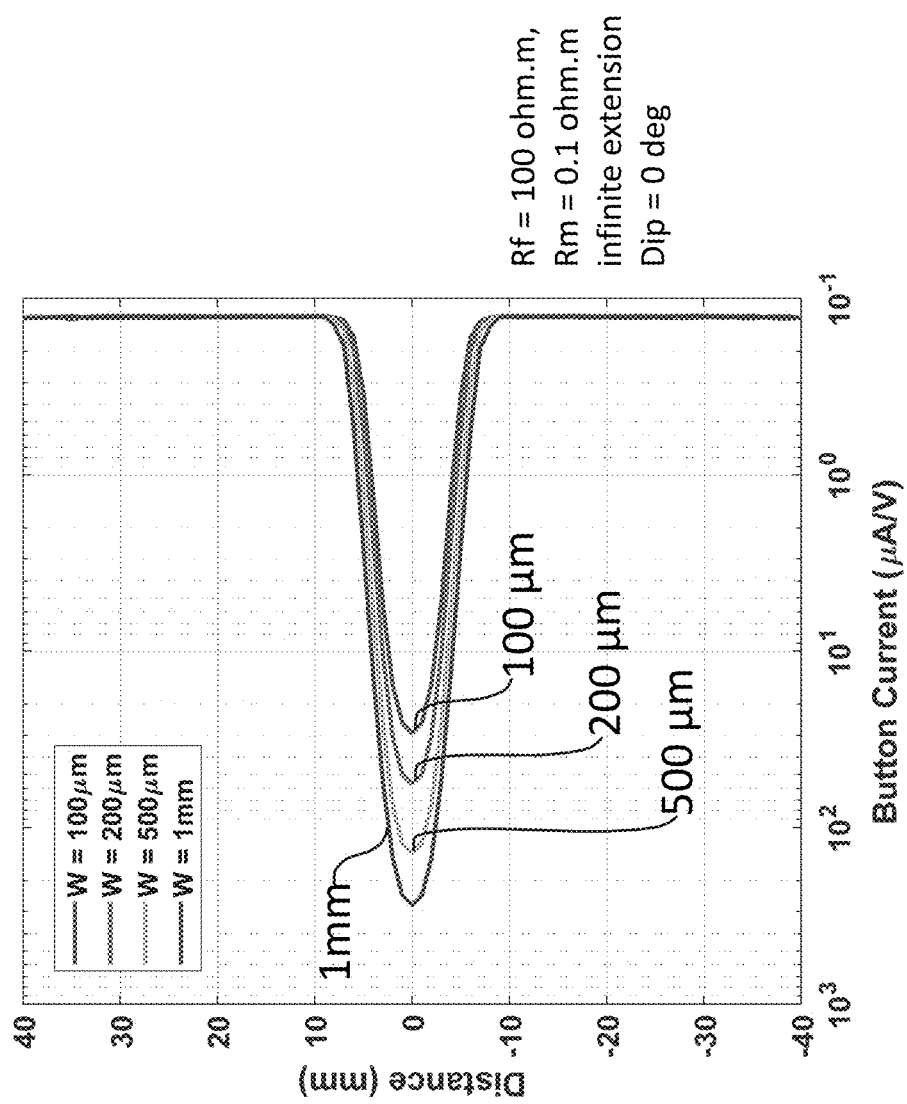
FIG. 3 illustrates a step of an embodiment.

FIG. 2 illustrates one embodiment of a wellbore 205 drilled into a subsurface formation 210 with a plurality of fractures, such as a fracture 215 with an aperture 220 and a fracture 225 with an aperture 230. FIG. 2 is not drawn to scale. A tool 235, such as a borehole imaging tool, may be lowered into the wellbore 205 (e.g., via wireline) to generate the at least one borehole image of the subsurface formation 210 (and the fractures 215, 225 within the subsurface formation 210). The borehole imaging tool may be positioned in an openhole (uncased) portion of the wellbore 205. The borehole imaging tool may be utilized during drilling of the wellbore 205 to generate at least one borehole image after each interval is drilled. Equation (1) may be solved for the fracture 215 to determine the value of the aperture 220 based on the at least one borehole image, such as a value of 500 microns. Similarly, equation (1) may be solved for the fracture 225 to determine the value of the aperture 230 based on the at least one borehole image. The value of the aperture 220 of the fracture 215 and the aperture 230 of the fracture 225 varies depending on the tool that is used, as discussed herein. FIG. 3 also illustrates one example of determining first aperture data based on the at least one borehole image.

Those of ordinary skill in the art will appreciate that the first aperture data based on the at least one borehole image may be determined in a variety of ways and the examples provided herein are not meant to be limiting. Indeed, in one embodiment, the first aperture data based on the at least one borehole image may be determined as described in Faivre, O., Fracture Evaluation From Quantitative Azimuthal Resistivities, Society of Petroleum Engineers, SPE 26434, Jan. 1, 1993, pages 179-192, which is incorporated by reference.

At 115, the method 100 includes determining second aperture data based on at the least one resistivity log for the plurality of fractures of the subsurface formation. Practically any type of resistivity tool that has fracture detection capabilities, including laterolog, induction, and propagation tools, may have been utilized to generate the at least one resistivity log. Resistivity tools typically have lower sensitivity in the near-wellbore zone, and fractures may generate very little response on a resistivity log if they are shorter than 10 inches.

In one embodiment, a second aperture based on the at least one resistivity log (e.g., laterolog) for the particular fracture may be determined using equation (2) below:

$$W = K * AAC * R_m \qquad (2)$$

where K is a coefficient depending on tool geometry and dip angle. Again, the assumption is that the particular fracture extends beyond the measurement volume (e.g., around 30 feet). If the particular fracture is less extensive, the calculation may be inaccurate, and the second aperture of the particular fracture may be underestimated. Furthermore, determining the second aperture of the particular fracture via equation (2) includes using the location and the dip of the particular fracture. The location may be determined in an automated manner from the at least one borehole image or received as input from a user. The dip may be determined in an automated manner from the at least one borehole image or received as input from a user. Equation (2) may be solved for each fracture of the plurality of fractures in some embodiments. Equation (2) is a derivation of the laterolog resistivity aperture calculation described in Sibbit, A. M., & Faivre, O., The Dual Laterolog Response In Fractured Rocks. Society of Petrophysicists and Well-Log Analysts, SPWLA Twenty-Sixth Annual Logging Symposium, Jun. 17-20, 1985, pages 1-34, which is incorporated by reference.

Figure 4:
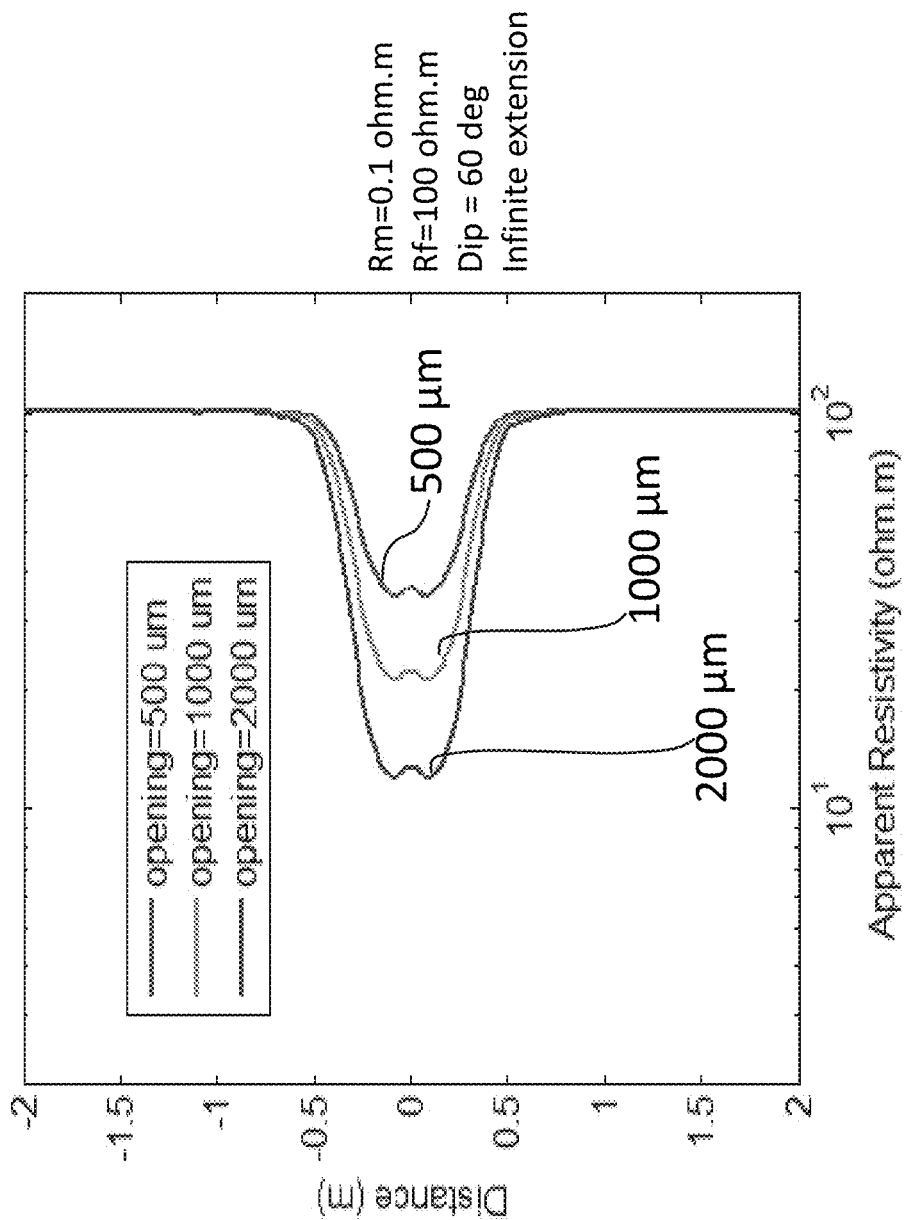
FIG. 4 illustrates a step of an embodiment.

Returning to FIG. 2, the tool 235, such as a resistivity tool, may be lowered into the wellbore 205 to generate the at least one resistivity log for the formation 210 (and the fractures 215, 225 within the subsurface formation 210). The resistivity tool may be positioned in an openhole (uncased) portion of the wellbore 205. The resistivity tool may be utilized during drilling of the wellbore 205 to generate at least one resistivity log after each interval is drilled. However, the specific details of the borehole imaging tool, and the specific details of the resistivity tool, may vary. For example, the borehole imaging tool may be lowered and retrieved (e.g., via wireline) from the wellbore 205 first, and then the resistivity tool may be lowered and retrieved (e.g., via wireline) from the wellbore 205, or vice versa. Equation (2) may be solved for the particular fracture 215 to determine the value of the aperture 220 based on the at least one resistivity log, such as a value of 50 microns. Similarly, equation (2) may be solved for the fracture 225 to determine the value of the aperture 230 based on the at least one resistivity log. The value of the aperture 220 of the fracture 215 and the aperture 230 of the fracture 225 varies depending on the tool that is used, as discussed herein. FIG. 4 illustrates one example of determining the second aperture data based on the at least one resistivity log.

Those of ordinary skill in the art will appreciate that the second aperture data based on the at least one resistivity log may be determined in a variety of ways and the examples provided herein are not meant to be limiting. In some embodiment, the second aperture data from the at least one resistivity log may be determined using a laterolog resistivity aperture calculation, such as the calculation described in Li, Shanjun, etc., Identification and Evaluation of Fractured Tight-Sand Oil Reservoir in Deep Zone of Bohai Gulf, SPWLA 47$^{th}$ Annual Logging Symposium, Jun. 4-7, 2006, pages 1-12, which is incorporated by reference. In one embodiment, the second aperture data from the at least one resistivity log may be determined via fracture characterization using triaxial induction tools, such as described in Wu, P., et al., Fracture Characterization Using Triaxial Induction Tools. Society of Petrophysicists and Well-Log Analysts, SPWLA 54th Annual Logging Symposium, Jun. 22-26, 2013, pages 1-16 and/or Wang, H., Huang, W., Fang, Y., Zhang, R., Wang, D., Zhan, Q., & Liu, Q. H., Efficient and Accurate Electromagnetic Modeling of Triaxial Induction Responses From Multiscale Fractures for Well-Logging Applications, IEEE Journal on Multiscale and Multiphysics Computational Techniques, vol. 4, 2019, pages 20-28, each of which is incorporated by reference.

Figure 5:
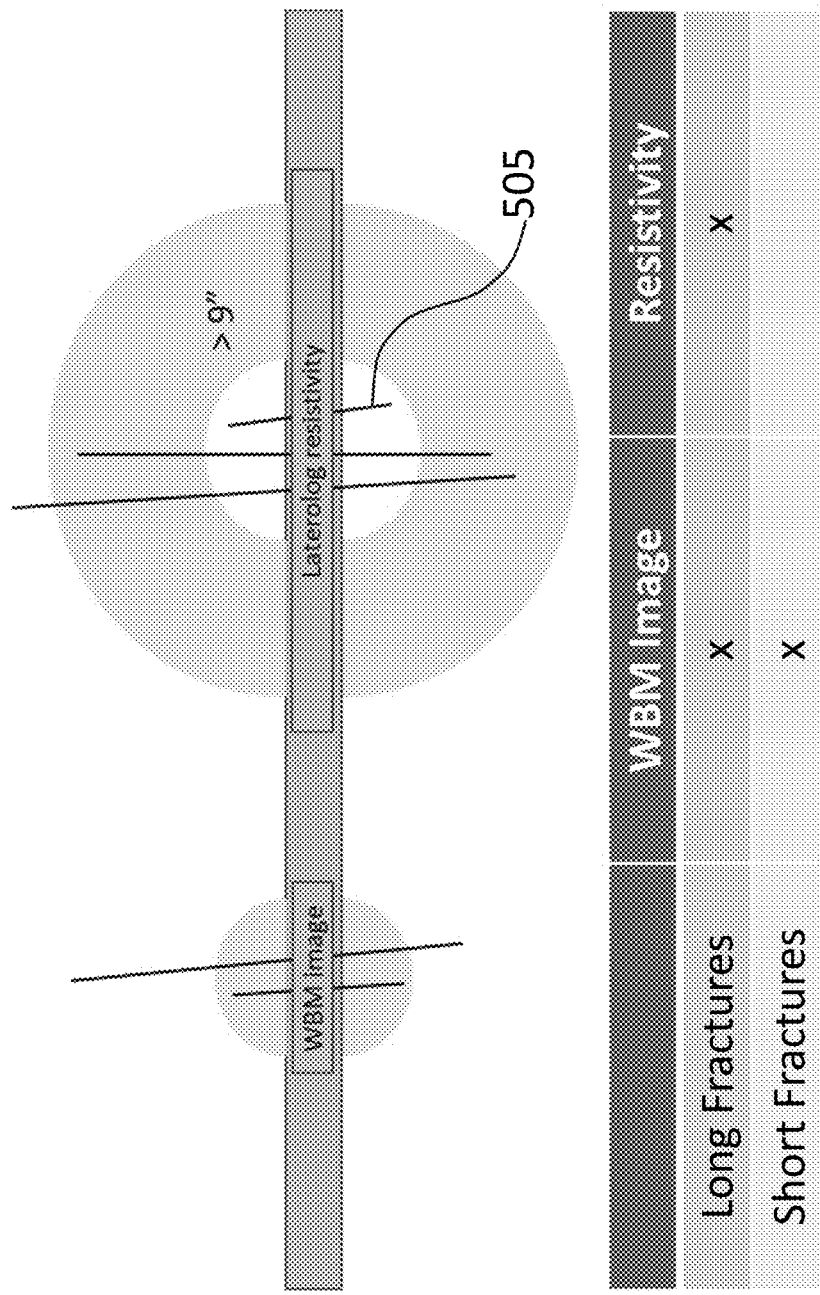
FIG. 5 illustrates a step of an embodiment.

At 120, the method 100 includes comparing the first aperture data based on the at least one borehole image and the second aperture data based on at least one resistivity log to determine whether to categorize each fracture of the plurality of fractures as a naturally occurring fracture or a non-naturally occurring fracture. FIG. 5 illustrates that the borehole imaging tool and the resistivity tool (e.g., a laterolog resistivity tool) focus on different volumes of the subsurface formation.

In some embodiments, the particular fracture is detected by the borehole imaging tool and the resistivity tool, and therefore, two apertures with non-zero values may be determined for the particular fracture using equation (1) and equation (2). On the other hand, in some embodiments, the particular fracture may be detected by the borehole imaging tool, but not the resistivity tool. For example, the equation (1) utilized to determine the aperture based on the at least one borehole image leads to a non-zero value, but the aperture based on the at least one resistivity log (e.g., using equation (2)) leads to a zero value. By comparing the aperture based on the borehole image of a particular fracture and the aperture based on the resistivity log of the particular fracture, the particular fracture may be determined to be a naturally occurring fracture or a non-naturally occurring fracture. A comparison may be performed for each fracture of the plurality of fractures in some embodiments.

In one embodiment, the comparison may use at least one threshold. In one embodiment, the threshold may include a percentage. For example, the percentage may be: 75%, 80%, 85%, 90%, or 95%. For example, the percentage may be: of from 75%-95%, such as of from 75%-90%, of from 80%-90%, of from 85%-90%, or of from 85%-95%. In one embodiment, the threshold may include a numerical value, such as, but not limited to, zero microns. In one embodiment, multiple thresholds may be utilized for the comparison at 120. The threshold(s) may be selected via user input or via an automated manner.

In some embodiments, if the particular fracture is detected on a borehole image, but the aperture based on a resistivity log for that particular fracture is substantially less (e.g., 90% less with 90% being a threshold) than the aperture based on the borehole image of that particular fracture, then the comparison indicates that the particular fracture may not propagate far from the wellbore. Therefore, the particular fracture may be categorized as a non-naturally occurring fracture. Similarly, as another example, if the particular fracture is detected on a borehole image, but the aperture based on a resistivity log for that particular fracture is zero microns (e.g., zero microns is another threshold), then the comparison indicates that the particular fracture may not propagate far from the wellbore. Therefore, the particular fracture may be categorized as a non-naturally occurring fracture. FIG. 5 illustrates an example in which a fracture 505 has an aperture based on the resistivity log of zero microns, but the fracture 105 would have an aperture based on the borehole image that is not zero microns. Based on the comparison, the fracture 105 would be categorized as a non-naturally occurring fracture.

On the other hand, in some embodiments, if the aperture based on a resistivity log for that particular fracture is not substantially less (e.g., not 90% less with 90% being a threshold) than the aperture based on a borehole image of that particular fracture, then the comparison indicates that the particular fracture may propagate far from the wellbore. Therefore, the particular fracture may be categorized as a naturally occurring fracture.

Returning to FIG. 2, equation (1) may be solved for the fracture 215 to determine the value of the aperture 220 based on the at least one borehole image, such as the value of 500 microns. Equation (2) may be solved for the fracture 215 to determine the value of the aperture 220 based on the at least one resistivity log, such as the value of 50 microns. The fracture 215 is detected on both the borehole image and the resistivity log, but the aperture based on the resistivity log of 50 microns is substantially less (e.g., 90% less) than the aperture based on the borehole image of 500 microns. This comparison indicates that the fracture 215 does not propagate far from the wellbore, and therefore, the fracture 215 may be categorized as a non-naturally occurring fracture. The larger the difference between the two non-zero aperture values of the fracture, the higher the confidence may be in the categorization.

Figure 6:
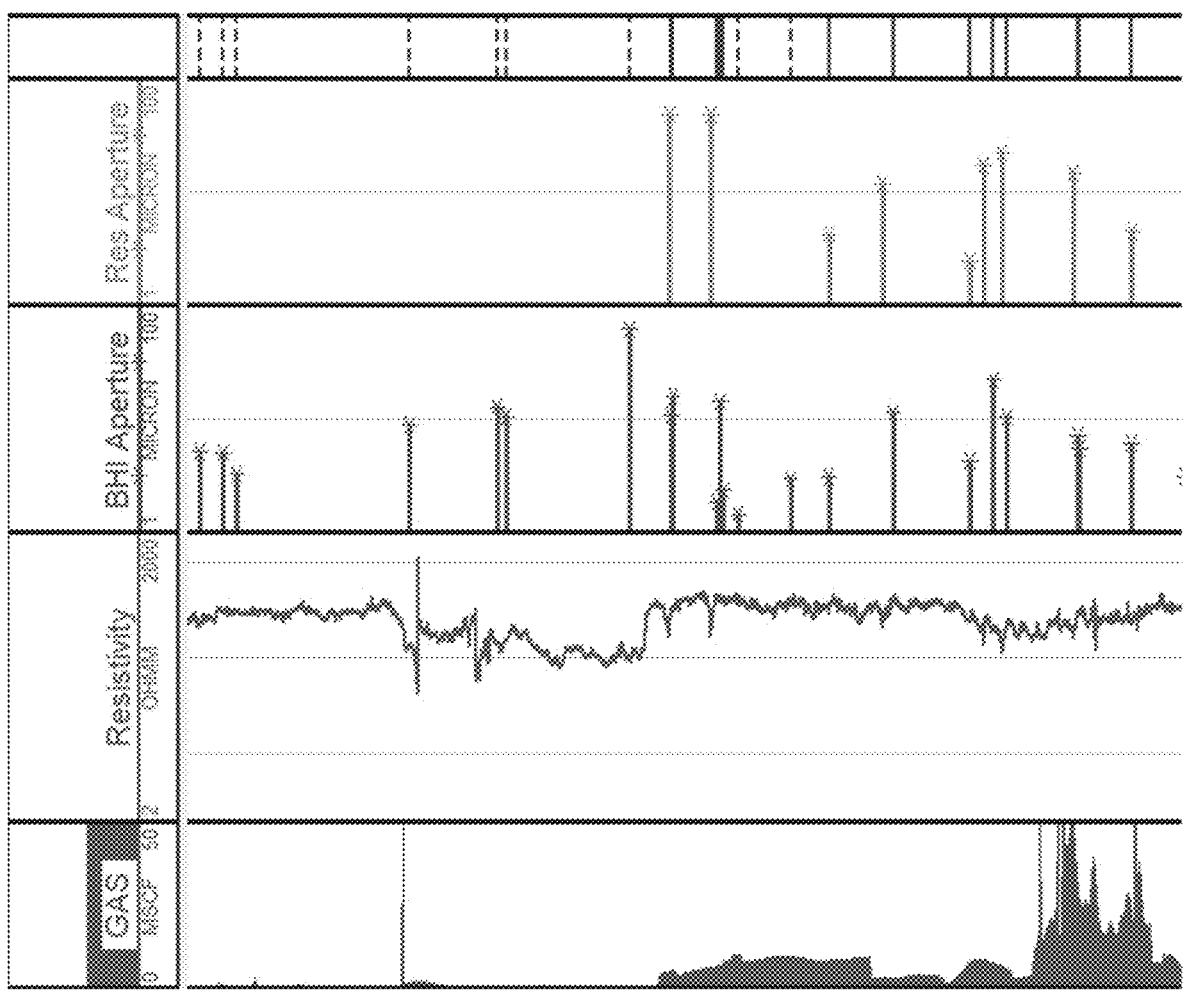
FIG. 6 illustrates a graphical display produced by an embodiment including a result of an embodiment.
Figure 7:
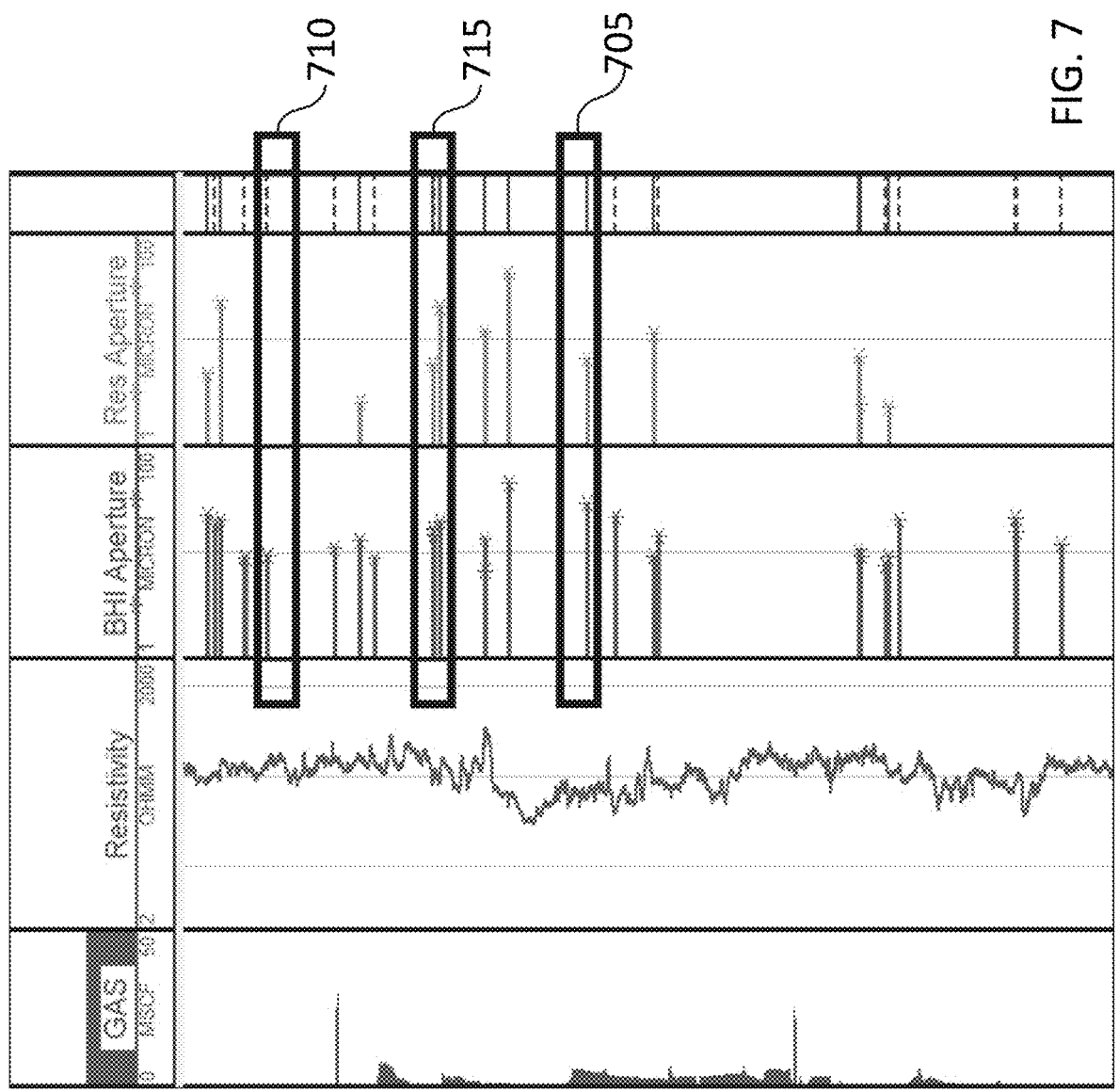
FIG. 7 illustrates a graphical display produced by an embodiment including a result of an embodiment.

At 125, the method 100 includes generating an output indicating the categorization of each fracture of the plurality of fractures (e.g., using visual effects to display the categorization). At 130, the method 100 includes displaying the output on a graphical user interface. FIGS. 6-7 illustrate example plots that may be generated and that indicate the categorization in the rightmost columns. Some or all of the plots may be output on a graphical user interface. The BHI Aperture columns (third columns from the right) illustrate aperture data based on at least one borehole image for this plurality of fractures. The Res Aperture columns (second columns from the right) illustrate aperture data based on at least one resistivity log for this plurality of fractures. The rightmost columns may be generated based on comparisons of the BHI Aperture data and the Res Aperture data, as well as the categorization resulting from the comparisons. In the rightmost columns, a solid line indicates the category of naturally occurring fracture and a dashed line indicates the category of non-naturally occurring fracture for the corresponding fracture.

Turning to box 705 in FIG. 7, the particular fracture corresponding to box 705 appears in the borehole image based on the BHI Aperture data in the box 705, that particular fracture appears in the resistivity log based on the Res Aperture data in the box 705, and the solid line in the rightmost column indicates that the comparison of the apertures for that particular fracture leads to a categorization of naturally occurring fracture. On the other hand, turning to box 710 of FIG. 7, the particular fracture corresponding to box 710 appears in the borehole image based on the BHI Aperture data in the box 710, but that particular fracture does not appear in the resistivity log based on the Res Aperture data in the box 710, and the dashed line in the rightmost column indicates that the comparison of the apertures for that particular fracture leads to a categorization of non-naturally occurring fracture. In box 715, the particular fracture corresponding to box 715 appears in the borehole image based on the BHI Aperture data in the box 715, that particular fracture appears in the resistivity log based on the Res Aperture data in the box 715, and the dashed line in the rightmost column indicates that the comparison of the apertures for that particular fracture leads to a categorization of non-naturally occurring fracture. Reservoir models, simulations, hydrocarbon in place estimates, etc. may be more accurate if the fractures categorized as non-naturally occurring fractures in the rightmost column of FIGS. 6-7 are excluded, given lower weight, etc.

Optionally, at 135, the method 100 includes validating the categorization using geomechanical modeling data (e.g., local stress regime), well test data (e.g., FDT), mud log data (e.g., mud log data indicating which interval has hydrocarbons), core data, or any combination thereof. This information for validation may be obtained in a manner similar to step 105. Step 135 may be performed after step 120. As an example, if the well test data indicates that the categorization is substantially accurate for a particular fracture, then the categorization at 120 is utilized for that particular fracture, and so on for each fracture. At least one threshold may be utilized for the validation, and the threshold may depend on the data used for the validation. For example, if the gas in an interval is equal to or above a particular gas threshold (e.g., 5 mscf, but the particular gas threshold may depend on the specific subsurface formation), then the gas suggests the existence of naturally occurring fractures in that interval. Alternatively, for example, if the gas in an interval is below the gas threshold, then the gas suggests the existence of non-naturally occurring fractures in that interval.

Optionally, at 140, the method 100 includes recategorizing at least one fracture responsive to the validation. In some embodiments, if well test data indicates that a predetermined quantity of the categorization is inaccurate (e.g., at least one categorization is inaccurate, at least 25% of the categorizations are inaccurate, etc.), then the threshold(s) may be adjusted at 120 and the comparison at 120 may be repeated. Afterwards, at least one fracture that was categorized as a naturally occurring fracture may be recategorized as a non-naturally occurring fracture and/or at least one fracture that was categorized as a non-naturally occurring fracture may be recategorized as a naturally occurring fracture.

The gas column in FIGS. 6-7 validates that the categorization in the rightmost column are substantially correct. For example, no gas is illustrated in the interval corresponding to the fracture of the box 710, and therefore the gas is below the gas threshold, which validates the categorization of non-naturally occurring fracture. On the other hand, gas is illustrated in the interval corresponding to the fracture of the box 705, and the gas is equal to or above the gas threshold, which validates the categorization of naturally occurring fracture.

In some embodiments, the method 100 may iterate through 120, 135, and 140 until a threshold is met or surpassed, for example, an accuracy related threshold, etc.

Optionally, at 145, the method 100 includes using at least one fracture categorized as a naturally occurring fracture in a reservoir model. For example, fractures that are categorized as naturally occurring fractures are more likely to include hydrocarbons, and thus, it may be advantageous to utilize fractures that are categorized as naturally occurring fractures in the reservoir model. In some embodiments, the orientation, the aperture (e.g., the two apertures based on the borehole image and the resistivity log may be used as they may be comparable, a combination of apertures from image, resistivity, and/or core may be utilized, etc.), the length, and the height of each fracture categorized as a naturally occurring fracture may be utilized in the reservoir model. Step 145 may include using fractures that are categorized as naturally occurring fractures to generate a new reservoir model, update an existing reservoir model, update an existing fracture network used in a reservoir model, etc.

Optionally, at 150, the method 100 includes running a simulation of the reservoir model with the at least one fracture categorized as a naturally occurring fracture. In some embodiments, the orientation, the aperture (e.g., the two apertures based on the borehole image and the resistivity log may be used as they may be comparable, a combination of apertures from image, resistivity, and/or core may be utilized, etc.), the length, and the height of each fracture categorized as a naturally occurring fracture may be utilized (see step 145), as well as density of fractures. Practically any simulation technique in the art may be utilized. The simulation may be utilized to make decisions regarding well spacing, well location, well type (e.g., vertical trajectory, horizontal trajectory, high angle trajectory, etc.), well pad, etc.

Optionally, at 155, the method 100 includes excluding at least one fracture categorized as a non-naturally occurring fracture from the reservoir model. For example, reservoir modeling and/or simulation may occur faster by excluding fractures categorized as non-naturally occurring fractures, as these are less likely to include hydrocarbons. Reservoir models, simulations, hydrocarbon in place estimates, etc. may be more accurate if the fractures categorized as non-naturally occurring fractures in the rightmost column of FIGS. 6-7 are excluded, given lower weight, etc. Practically any reservoir modeling techniques in the art may be utilized.

Optionally, at 160, the method 100 includes determining an estimate of hydrocarbon in place within the fractures categorized as naturally occurring fractures. In some embodiments, the estimate of the hydrocarbon in place may be determined using the following equations. Fracture porosity $Ø_f$ is computed by equation (3) below:

$$\phi_f = \frac{\sum_{i=1}^{n_f} a_{fi} h_{fi}}{D h_r} \quad (3)$$

where $n_f$ is a total number of fractures in an interval of interest, $a_{fi}$ and $h_{fi}$ are aperture and length of the $i_{th}$ fracture, D is wellbore diameter, and $h_r$ is length of the interval of interest. For the aperture in equation (3): the two apertures based on the borehole image and the resistivity log may be used as they may be comparable, a combination of apertures from image, resistivity, and/or core may be utilized, etc. Total porosity is $Ø_t=Ø_f+Ø_m$, where $Ø_m$ is matrix porosity. Hydrocarbon in place may then be calculated through equation (4) below:

$$HCIP = A \times h \times Ø_t \times (1-S_w)/B \quad (4)$$

where HCIP is hydrocarbon in place, A is area of reservoir, h is thickness of pay zone, $S_w$ is water saturation, and B is formation volume factor.

One of ordinary skill in the art may appreciate that new or more accurate information on the subsurface fractures may be determined via the embodiment provided herein (e.g., categorization of a fractureA and the categorization of the fractureA gives information about the extensiveness of the fractureA), which is input for fractured reservoir models. Geologists and engineers can leverage the results and focus on the longer fractures for modeling and simulations, as these are more likely to form effective paths for hydrocarbon flow. The embodiments provided herein may also be utilized to separate naturally occurring fractures from non-naturally occurring fractures (e.g., fractures a few inches long created during drilling of a wellbore), which may be extremely difficult to differentiate in high-angle or horizontal wells.

Example: One embodiment was tested on a horizontal well in a carbonate formation, where two fracture sets were originally identified. After a joint interpretation with resistivity log and borehole image, one set of the fractures appeared to be consistently shorter than the other and to be categorized as non-naturally occurring fractures. Upon further analysis of the local stress regime, the shorter fractures were identified as being created by drilling a wellbore, and these non-naturally occurring fractures were not incorporated in the modeling of natural fractures. The new results have improved the understanding of the regional fracture system, leading to a more accurate fracture network model in this example.

Those of ordinary skill in the art will appreciate that modifications (e.g., additions, deletions, change in order, etc.) may made to the embodiments provided herein. For example, some embodiments may additionally include fracture interpretation on borehole image logs: upon receiving the image, an interpreter identifies the fractures either manually or automatically by running a software. As borehole images are scans around the wellbore surface, planar fractures appear as sinusoidal traces, and the amplitude of the sinusoids represents the apparent dip angle of the fractures. The depth, dip, and openness of each fracture are recorded. Interpretation and results thereof may be provided as user input into the method 100.

Figure 8:
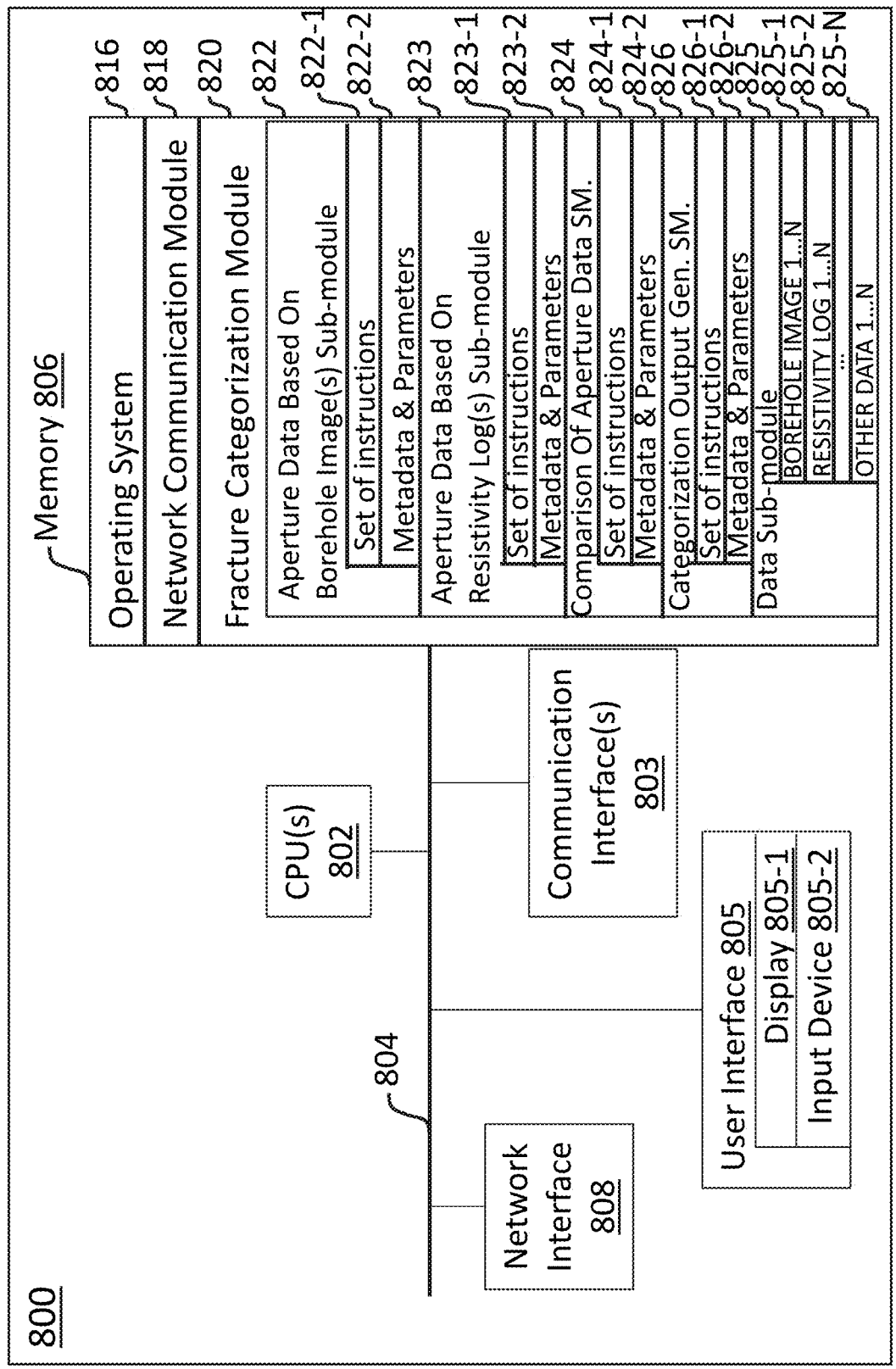
FIG. 8 is a block diagram illustrating a fracture categorization system, in accordance with some embodiments.

FIG. 8 is a block diagram illustrating a fracture categorization system 800, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the fracture categorization system 800 includes one or more processing units (CPUs) 802, one or more network interfaces 808 and/or other communications interfaces 803, memory 806, and one or more communication buses 804 for interconnecting these and various other components. The fracture categorization system 800 also includes a user interface 805 (e.g., a display 805-1 and an input device 805-2). The communication buses 804 may include circuitry (sometimes called a chipset) that interconnects and controls communications between system components. Memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 may optionally include one or more storage devices remotely located from the CPUs 802. Memory 806, including the non-volatile and volatile memory devices within memory 806, comprises a non-transitory computer readable storage medium and may store borehole image(s), resistivity log(s), geomechanical modeling data, well test data, mud log data, core data, and/or processed data products.

In some embodiments, memory 806 or the non-transitory computer readable storage medium of memory 806 stores the following programs, modules and data structures, or a subset thereof including an operating system 816, a network communication module 818, and a fracture categorization module 820.

The operating system 816 includes procedures for handling various basic system services and for performing hardware dependent tasks.

The network communication module 818 facilitates communication with other devices via the communication network interfaces 808 (wired or wireless) and one or more communication networks, such as the Internet, other wide area networks, local area networks, metropolitan area networks, and so on.

In some embodiments, the fracture categorization module 820 executes the operations of method 100. The fracture categorization module 820 may include data sub-module 825, which handles the borehole images, resistivity logs, geomechanical modeling data, well test data, mud log data, and/or core data. This data is supplied by data sub-module 825 to other sub-modules.

Aperture data based on borehole image(s) sub-module 822 contains a set of instructions 822-1 and accepts metadata and parameters 822-2 that will enable it to execute the operations related to determining first aperture data based on at least one borehole image for a plurality of fractures of subsurface formation as described in method 100. Aperture data based on resistivity log(s) sub-module 823 contains a set of instructions 823-1 and accepts metadata and parameters 823-2 that will enable it to execute the operations related to determining second aperture data based on at least one resistivity log for the plurality of fractures of the subsurface formation as described in method 100. Comparison of aperture data sub-module 824 contains a set of instructions 824-1 and accepts metadata and parameters 824-2 that will enable it to execute the operations related to comparing the first aperture data based on the at least one borehole image and the second aperture data based on at least one resistivity log to determine whether to categorize each fracture of the plurality of fractures as a naturally occurring fracture or a non-naturally occurring fracture as described in method 100. Sub-module 824 may also be utilized to execute the operations related to validation and recategorization. Categorization output generation sub-module 826 contains a set of instructions 826-1 and accepts metadata and parameters 826-2 that will enable it to execute the operations related to generating an output indicating the categorization of each fracture of the plurality of fractures as described in method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing data and categorizing fractures. For example, any of the sub-modules may optionally be able to generate a display that would be sent to and shown on the user interface display 805-1, such as displaying the output on a graphical user interface as described in method 100. In addition, any of the data or processed data products may be transmitted via the communication interface(s) 803 or the network interface 808 and may be stored in memory 806.

Method 100 is, optionally, governed by instructions that are stored in computer memory or a non-transitory computer readable storage medium (e.g., memory 806 in FIG. 8) and are executed by one or more processors (e.g., processors 802) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of categorizing fractures in a subsurface formation, the method comprising:
   obtaining, with one or more processors, at least one borehole image for a plurality of fractures in a subsurface formation and at least one resistivity log for the plurality of fractures of the subsurface formation;
   determining, with the one or more processors, first aperture data based on the at least one borehole image for the plurality of fractures of the subsurface formation;
   determining, with the one or more processors, second aperture data based on at the least one resistivity log for the plurality of fractures of the subsurface formation;
   comparing, with the one or more processors, the first aperture data based on the at least one borehole image and the second aperture data based on at least one resistivity log to determine whether to categorize each fracture of the plurality of fractures as a naturally occurring fracture or a non-naturally occurring fracture;
   generating, with the one or more processors, an output indicating the categorization of each fracture of the plurality of fractures; and
   displaying, with the one or more processors, the output on a graphical user interface.

2. The method of claim 1, further comprising using at least one fracture categorized as a naturally occurring fracture in a reservoir model.

3. The method of claim 2, further comprising running a simulation of the reservoir model with the at least one fracture categorized as a naturally occurring fracture.

4. The method of claim 2, further comprising excluding at least one fracture categorized as a non-naturally occurring fracture from the reservoir model.

5. The method of claim 1, further comprising determining an estimate of hydrocarbon in place within the fractures categorized as naturally occurring fractures.

6. The method of claim 1, further comprising validating the categorization using geomechanical modeling data, well test data, mud log data, core data, or any combination thereof.

7. The method of claim 6, further comprising recategorizing at least one fracture responsive to the validation.

8. A computer system comprising:
one or more processors;
memory; and
one or more programs, wherein the one or more programs are stored in the memory and configured to be executed by the one or more processors, the one or more programs including instructions that when executed by the one or more processors cause the computer system to:
obtain at least one borehole image for a plurality of fractures in a subsurface formation and at least one resistivity log for the plurality of fractures of the subsurface formation;
determine first aperture data based on the at least one borehole image for the plurality of fractures of the subsurface formation;
determine second aperture data based on at the least one resistivity log for the plurality of fractures of the subsurface formation;
compare the first aperture data based on the at least one borehole image and the second aperture data based on at least one resistivity log to determine whether to categorize each fracture of the plurality of fractures as a naturally occurring fracture or a non-naturally occurring fracture;
generate an output indicating the categorization of each fracture of the plurality of fractures; and
display the output on a graphical user interface.

9. The system of claim 8, further comprising instructions that when executed by the one or more processors cause the computer system to use at least one fracture categorized as a naturally occurring fracture in a reservoir model.

10. The system of claim 9, further comprising instructions that when executed by the one or more processors cause the computer system to run a simulation of the reservoir model with the at least one fracture categorized as a naturally occurring fracture.

11. The system of claim 9, further comprising instructions that when executed by the one or more processors cause the computer system to exclude at least one fracture categorized as a non-naturally occurring fracture from the reservoir model.

12. The system of claim 8, further comprising instructions that when executed by the one or more processors cause the computer system to determine an estimate of hydrocarbon in place within the fractures categorized as naturally occurring fractures.

13. The system of claim 8, further comprising instructions that when executed by the one or more processors cause the computer system to validate the categorization using geomechanical modeling data, well test data, mud log data, core data, or any combination thereof.

14. The system of claim 13, further comprising instructions that when executed by the one or more processors cause the computer system to recategorize at least one fracture responsive to the validation.

15. A non-transitory computer readable storage medium storing one or more programs, the one or more programs comprising instructions, which when executed by an electronic device with one or more processors and memory, cause the device to:
obtain at least one borehole image for a plurality of fractures in a subsurface formation and at least one resistivity log for the plurality of fractures of the subsurface formation;
determine first aperture data based on the at least one borehole image for the plurality of fractures of the subsurface formation;
determine second aperture data based on at the least one resistivity log for the plurality of fractures of the subsurface formation;
compare the first aperture data based on the at least one borehole image and the second aperture data based on at least one resistivity log to determine whether to categorize each fracture of the plurality of fractures as a naturally occurring fracture or a non-naturally occurring fracture;
generate an output indicating the categorization of each fracture of the plurality of fractures; and
display the output on a graphical user interface.

16. The non-transitory computer readable storage medium of claim 15, further comprising instructions that when executed by the one or more processors cause the device to use at least one fracture categorized as a naturally occurring fracture in a reservoir model.

17. The non-transitory computer readable storage medium of claim 16, further comprising instructions that when executed by the one or more processors cause the device to run a simulation of the reservoir model with the at least one fracture categorized as a naturally occurring fracture.

18. The non-transitory computer readable storage medium of claim 16, further comprising instructions that when executed by the one or more processors cause the device to exclude at least one fracture categorized as a non-naturally occurring fracture from the reservoir model.

19. The non-transitory computer readable storage medium of claim 15, further comprising instructions that when executed by the one or more processors cause the device to determine an estimate of hydrocarbon in place within the fractures categorized as naturally occurring fractures.

20. The non-transitory computer readable storage medium of claim 15, further comprising instructions that when executed by the one or more processors cause the device to validate the categorization using geomechanical modeling data, well test data, mud log data, core data, or any combination thereof.

* * * * *